C. J. WALSER.
Vehicle.
No. 167,205. Patented Aug. 31, 1875.
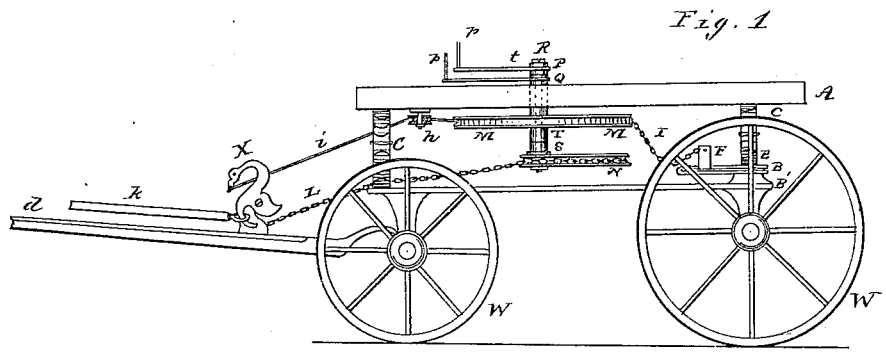
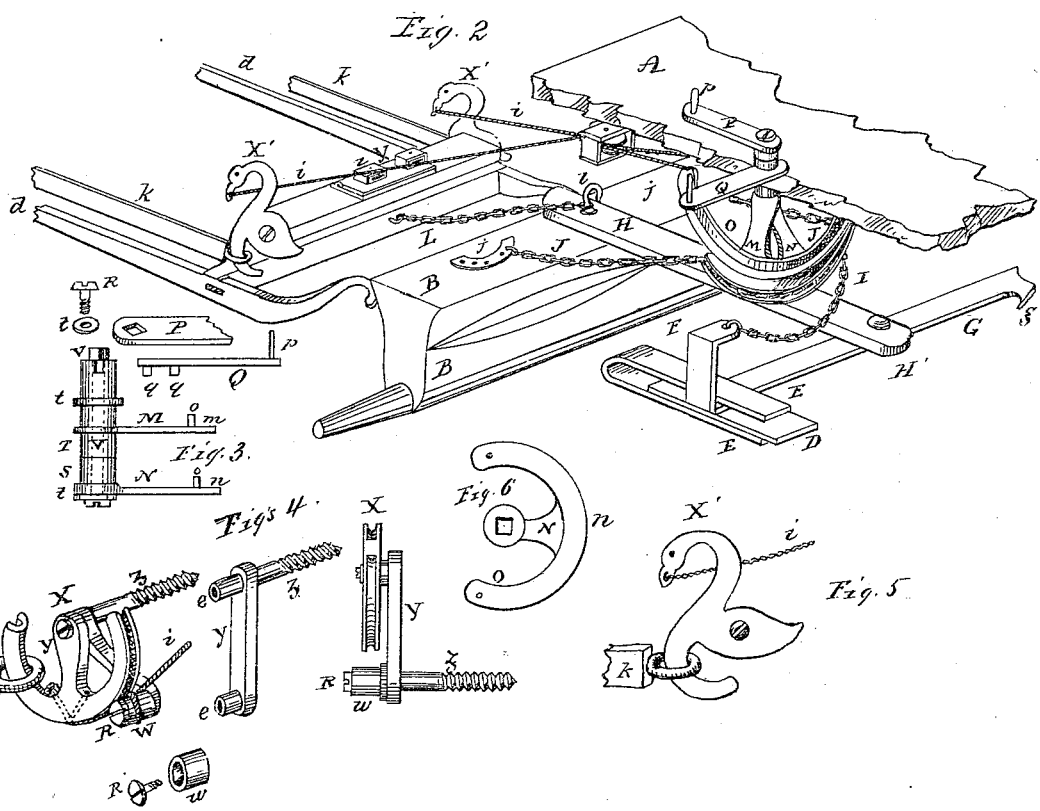
WITNESSES
W. B. Niles
Jacob Stauffer
INVENTOR
Chas. Jos. Walser

UNITED STATES PATENT OFFICE.

CHARLES J. WALSER, OF LANCASTER, PENNSYLVANIA.

IMPROVEMENT IN VEHICLES.

Specification forming part of Letters Patent No. 167,205, dated August 31, 1875; application filed June 1, 1875.

*To all whom it may concern:*

Be it known that I, CHARLES JOSEPH WALSER, now of the city of Lancaster, in the county of Lancaster and State of Pennsylvania, have invented certain Improvements in Vehicles, to unhitch, check, and guide them, of which the following is a specification:

The nature of my invention consists in the arrangement and combination of a pair of foot-levers on the bottom of a vehicle, connected on a single shaft with a pair of segmental flanged wheels placed under the bottom, by which means a fractious or runaway horse is not only suddenly released from the shafts (the shafts being suspended to prevent their dropping to the ground) by a turn of the foot-lever; but, if desired, by continuing the motion, a break is operated to lock the wheel, while at the same time the other foot-lever will guide the vehicle with ease and certainty along the shortest curves in the road, or to avoid embankments or obstructions, so dangerous in going down hill under the momentum imparted to the vehicle.

The accompanying drawings, with the letters of reference marked thereon, and a brief explanation, will enable those skilled in the art to make and use this invention, in which drawings—

Figure 1 is a side elevation of the running-gear and appliances. Fig. 2 is a perspective view of the levers, segmental wheels, &c., combined. Fig. 3 illustrates the construction of the shaft, lever, and wheel connection; Figs. 4 and 5, modified views of the trace-holders on the whiffletree. Fig. 6 shows one of the segmental flanged wheels.

There is a central perforation made through the bottom A of the vehicle. For a combined shaft the central portion V, or shaft proper, has both ends made square, leaving a shoulder, with a screw-thread cut in the vertical face or top and bottom ends for a screw, R. The lower end of this shaft V sets into a square eye made in the thickened end of the radial arm N, Fig. 6, of the semicircular wheel, with its flange $o$ and rim $n$, as shown. There is an annular loose sleeve, S, resting on said hub, and which supports a pipe or sleeve, T, to which the radial arm M of a similar segment of a wheel is centrally connected. The upper portion of said pipe (surrounding and revolving on the shaft V) comes flush with the top of the bottom A of the vehicle, and is provided with a square notch on each side for the reception of two lugs, $q$, on each side of a perforation, which sets over the rounded portion of the shaft, and connects the foot-lever Q with said segment-wheel M. The other foot-lever P, with its square opening, embraces the square top of the projecting shaft V, suitable washers being introduced on the upper and lower side of the bottom, and between the parts, to form the bearing and sustain the shaft with its appliances. These foot-levers P Q have a vertical pin, $p$, by which they can be separately or jointly moved, made so as to pass each other. The lower lever Q operates the upper semicircular wheel M, the free arms of which are separately connected, the forward end or arm with the cords $i$, made jointly to pass over a grooved pulley, $h$, suspended from the under side of the bottom A. The cords are carried forward, and on each side connected to the tilting or turning trace-holders X, connected with the whiffletree. The other arm of said wheel M connects by a chain, I, or its equivalent, to a vertical arm, F, of the brake G, on its central pivot in the coupling H', so that the rubber $g$, when drawn by the action of the brake, locks the wheel. Thus a push on the lever Q draws the cords back connected with the arm of the wheel, and tilts or turns the trace-holders until their connection with the traces becomes disengaged from the hooks that held them on each side of the vehicle, allowing the horse to clear the shafts and free to run where he pleases. A continued pressure on said lever Q will cause the chain I to act upon the brake G and arrest the motion of the wheel; but, to prevent accident by the shaft dropping down, they are prevented by a chain, L, which holds them in a raised position.

The sudden disengagement of a running horse, especially down a hill, or on elevated roads with short turns or impediments, by the momentum imparted to the vehicle, makes it still highly dangerous without a means to guide it. For this purpose the lower segmental wheel N is employed. This has its ends connected separately, by chains J, with the front axle of the vehicle, on each side near the wheel; or the chain, or its equivalent, may be continuous around the flange of the segmental wheel N, and both ends attached, so that a movement of the foot-lever P will act on the wheel, and turn the front gear, by means of the chain-connection, to the right or left, thus having easy and full control to cause the vehicle to turn around any short curve in the road to the right or left, or to avoid any obstacle and guide its motions effectually with perfect safety.

On the top of the whiffletree, centrally between the trace-holders X, is shown a pair of grooved pulleys, Z, on a hinged plate, Y. This may be employed, if it is desirable, to bring the cords $i$ from the trace-holders first to the center of the front part of the vehicle—found useful in some cases. So, also, the trace-holders themselves are shown modified by Figs. 4 and 5.

The ornamental reversed hook X' (swan-shaped) operates substantially as when formed into an open ring, X, Fig. 4, designed, however, to be adapted to an omnibus or elevated seat. The open ring X has a radial arm, which is perforated above its center, and sets over either lug $e$, (shown on the screw-arm $y$.) There is also a friction-roller, $w$, which slips over the other lug $e$. Thus the trace-holder can be set, as shown on the lug $e$, in a line with the screw $z$, that enters the end of the whiffletree and the roller $w$ on the lower lug. This arm can be secured at any position by the intervention of a washer. A perforation through the lower angle of the union of the radial arm with the open ring is made for a cord, $i$, which can be carried round in the groove, and over or around the roller $w$, set at the desired angle, and then connected with the segmental turn-wheel M. The object is to adapt it to the shaft and whiffletree, and to form the proper connection under various circumstances in the diversity of vehicles in their construction, as also in the transposition of the open wheel and roller $x$ $w$.

Fig. 5 illustrates the trace-holders shown in Fig. 2—the cord $i$ connected with the bill, the trace $k$ with the lower hook.

By drawing the head back the curved end is raised until the ring or trace connection is disengaged, and the horse left free and detached. Hence, either form may be adopted, believing that both are novel for this purpose.

I am aware that various devices are employed for disengaging horses from vehicles by a pull upon a cord, or its equivalent; but I am not aware of any combination and arrangement ever used before substantially as herein specified. Therefore,

What I claim as my invention is—

1. The combination of the foot-levers P Q and semicircular flanged wheels M N on a single shaft, V, constructed and arranged substantially as and for the purpose specified.

2. In combination with foot-lever Q and the segmental wheel M, the connections $i$, with the trace-holder X at one end of said wheel and the connection I at the other end, with the brake arrangement F, G, and $g$, substantially arranged and operated as and for the purpose mentioned.

3. In combination with foot-lever P and segmental wheel N, the connecting chain or chains J for guiding the vehicle, substantially as and for the purpose set forth.

CHAS. JOS. WALSER.

Witnesses:
WM. B. WILEY,
JACOB STAUFFER.